United States Patent
Yamamoto

(10) Patent No.: US 10,644,878 B2
(45) Date of Patent: May 5, 2020

(54) KEY MANAGEMENT SYSTEM AND METHOD

(71) Applicant: NTT Innovation Institute 1 LLC, East Palo Alto, CA (US)

(72) Inventor: Go Yamamoto, East Palo Alto, CA (US)

(73) Assignee: NTT Research, East Palo Alto, CA (US)

( * ) Notice: Subject to any disclaimer, the term of this patent is extended or adjusted under 35 U.S.C. 154(b) by 158 days.

(21) Appl. No.: 15/192,755

(22) Filed: Jun. 24, 2016

(65) Prior Publication Data

US 2017/0373835 A1    Dec. 28, 2017

(51) Int. Cl.
| | | |
|---|---|---|
| *H04L 9/06* | (2006.01) | |
| *H04L 9/08* | (2006.01) | |
| *H04L 9/30* | (2006.01) | |
| *H04L 9/14* | (2006.01) | |

(52) U.S. Cl.
CPC .......... *H04L 9/0618* (2013.01); *H04L 9/0841* (2013.01); *H04L 9/0891* (2013.01); *H04L 9/0894* (2013.01); *H04L 9/14* (2013.01); *H04L 9/30* (2013.01); *H04L 9/302* (2013.01); *H04L 2209/24* (2013.01)

(58) Field of Classification Search
CPC . H04L 9/0618; H04L 9/14; H04L 9/30; H04L 2209/24
See application file for complete search history.

(56) References Cited

U.S. PATENT DOCUMENTS

| | | | |
|---|---|---|---|
| 7,912,698 B2 | 3/2011 | Statnikov et al. | |
| 8,135,718 B1 | 3/2012 | Das et al. | |
| 8,418,249 B1 | 4/2013 | Nuycci | |
| 8,762,298 B1 | 6/2014 | Ranjan | |
| 2002/0052858 A1 | 5/2002 | Goldman et al. | |
| 2002/0138492 A1 | 9/2002 | Kil | |
| 2004/0128535 A1* | 7/2004 | Cheng | G06F 21/6209 380/285 |
| 2006/0037080 A1 | 2/2006 | Maloof | |
| 2008/0220740 A1 | 9/2008 | Shatzkamer | |
| 2008/0279387 A1* | 11/2008 | Gassoway | H04L 9/0825 380/279 |
| 2008/0294019 A1 | 11/2008 | Tran | |
| 2009/0028141 A1 | 1/2009 | Vu Duong et al. | |
| 2009/0254992 A1 | 10/2009 | Schultz et al. | |
| 2010/0007489 A1 | 1/2010 | Misra et al. | |
| 2010/0183211 A1 | 7/2010 | Meetz et al. | |
| 2010/0201489 A1* | 8/2010 | Griffin | G06F 21/6245 340/10.1 |
| 2011/0299420 A1 | 12/2011 | Waggener et al. | |
| 2012/0167210 A1 | 6/2012 | Oro Garcia | |
| 2013/0111036 A1 | 5/2013 | Ozawa et al. | |

(Continued)

OTHER PUBLICATIONS

Auto-WEKA webpage printed regarding algorithms (2 pages) (Chris Thornton et al.) Feb. 17, 2015.
Ayat, N.E.; Cheriet, M.; Suen, C.Y.; "Automatic Model Selection for the optimization of SVM Kernels," Mar. 21, 2005 (35 pages).

(Continued)

*Primary Examiner* — Hee K Song
(74) *Attorney, Agent, or Firm* — DLA Piper LLP (US)

(57) ABSTRACT

A system and method for private key management in a public key encryption system are disclosed. In one embodiment, the system and method may utilize a "fake" private key to provide the private key management.

29 Claims, 7 Drawing Sheets

(56) References Cited

U.S. PATENT DOCUMENTS

| | | | |
|---|---|---|---|
| 2014/0122370 A1 | 5/2014 | Jamal et al. | |
| 2014/0136846 A1* | 5/2014 | Kitze | H04L 67/2814 |
| | | | 713/170 |
| 2014/0201374 A1 | 7/2014 | Ashwood-Smith | |
| 2014/0219096 A1 | 8/2014 | Rabie et al. | |
| 2014/0229739 A1* | 8/2014 | Roth | G06F 21/6218 |
| | | | 713/189 |
| 2014/0259170 A1 | 9/2014 | Amsler | |
| 2014/0317261 A1 | 10/2014 | Shatzkamer et al. | |
| 2014/0317293 A1 | 10/2014 | Shatzkamer | |
| 2014/0325231 A1 | 10/2014 | Hook et al. | |
| 2015/0074807 A1 | 3/2015 | Turbin | |
| 2015/0082308 A1 | 3/2015 | Kiess et al. | |
| 2015/0227964 A1 | 8/2015 | Yan et al. | |
| 2015/0288767 A1 | 10/2015 | Fargano et al. | |
| 2015/0317169 A1 | 11/2015 | Sinha et al. | |
| 2015/0326535 A1 | 11/2015 | Rao et al. | |
| 2015/0333979 A1 | 11/2015 | Schwengler et al. | |
| 2015/0381423 A1 | 12/2015 | Xiang | |
| 2016/0006642 A1 | 1/2016 | Chang et al. | |
| 2016/0050161 A1 | 2/2016 | Da et al. | |
| 2016/0057234 A1 | 2/2016 | Parikh et al. | |
| 2016/0154960 A1 | 6/2016 | Sharma et al. | |
| 2016/0248805 A1 | 8/2016 | Burns et al. | |
| 2016/0364553 A1* | 12/2016 | Smith | G06F 21/105 |
| 2017/0149804 A1 | 5/2017 | Kolbitsch | |

OTHER PUBLICATIONS

Brodley, Carla E., "Addressing the Selective Superiority Problem: Automatic Algorithm/Model Class Selection," (1993) (8 pages).
Chapelle, Olivier; Vapnik, Vladimir; Bousquet, Olivier; Mukherjee, Sayan; "Choosing Multiple Parameters for Support Vector Machines," *Machine Learning*, 46, 131-159, 2002 © 2002 Kluwer Academic Publishers (29 pages).
Lee, Jen-Hao and Lin, Chih-Jen, "Automatic Model Selection for Support Vector Machines, pp. 1-16" (2000).
Smith, Michael R.; Mitchell, Logan; Giraud-Carrier, Christophe; Martinez, Tony; "Recommending Learning Algorithms and Their Associated Hyperparameters," Jul. 7, 2014 (2 pages).
Thornton, Chris. Thesis: "Auto-WEKA: Combined Selection and Hyperparameter Optimization of Supervised Maching Learning Algorithms," Submitted to the University of British Columbia, Mar. 2014 (75 pages).
Thornton, Chris; Hutter, Frank; Hoos, Holger H.; Leyton-Brown, Kevin. "Auto-WEKA: Combined Selection and Hyperparameter Optimization of Classification Algorithms," Mar. 2013 (9 pages).
Wolinski, Christophe; Kuchcinski, Krzysztof. "Automatic Selection of Application-Specific Reconfigurable Processor Extensions." *Design, Autoination & Test in Europe Conference* (DATE '08), Mar. 2008, Munich, Germany, pp. 1214-1219 (7 pages).
Workshop Handout edited by Joaquin Vanschoren, Pavel Brazdil, Carlos Soares and Lars Kotthoff, "Meta-Learning and Algorithm Selection Workshop at ECAI 2014," MetaSel 2014, Aug. 19, 2014 (66 pages).
H. Larochelle et al. "An empirical evaluation of deep architectures on problems with many factors of variation" ACM ICML '07, p. 473-480 (8 pgs).
J. Bergstra et al. "Random Search for Hyper-Parameter Optimization" Journal of Machine Learning Research 13 (2012), p. 281-305 (25 pgs).
Wikipedia—anonymous—https://en.wikipedia.org/wiki/Decision_tree (5 pgs).
Wikipedia—anonymous—en.wikipedia.org/wiki/Support_vector_machine (16 pgs).
Wikipedia—anonymous—en.wikipedia.org/wiki/K-nearest_neighbors_algorithm (11 pgs).
Wikipedia—anonymous—en.wikipedia.org/wiki/Gradient_boosting (8 pgs).
Wikipedia—anonymous—en.wikipedia.org/wiki/Naive_Bayes_classifier (10 pgs).
Wikipedia—anonymous—en.wikipedia.org/wiki/Bootstrap_aggregating (3 pgs).
Wikipedia—anonymous—en.wikipedia.org/wiki/Logistic_regression (14 pgs).
Wikipedia—anonymous—en.wikipedia.org/wiki/AdaBoos(12 pgs).
Website: KAGGLE—https://www.kaggle.com/wiki/Home (2 pgs.).
Wikipedia—anonymous—TLS: Transport Layer Security Protoco—Webpage https://en.wikipedia.org/wiki/Transport_Layer_security (35 pgs/).
NIST—National Insitute of Standards and Technology, US Department of Commerce "Computer Security Resource Center" AES Algorithm With Galois Counter Mode of Operation. Webpage https://csrc.nist.gov/projects/block-cipher-techniques/bcm (3 pgs.).
Moriarty, et al. PKI Certificate—PKCS #12: Personal Information Exchange Syntax v1.1—Webpage https://tools.ietf.org/html/rfc7292 (30 pgs.).
ITU—International Telecommunication Union—Open Systems Interconnection—X.509: Information Technology—Public-key and attribute framework certificate—Webpage http://www.itu.int/rec/T-REC-X.509/enn (2 pgs.).
Groves, M., Sakai-Kasahara Key Encryption (SAKKE)—Internet Engineering Task Force dated Feb. 2012—Webpage https://tools.ietf.org/html/rfc6508 (22 pgs.).
Barbosa, L. et al.—SK-KEM: An Identity-Based Kem, Algorithm standardized in IEEE—Webpage http://grouper.ieee.org/groups/1363/IBC/submissions/Barbosa-SK-KEM-2006-06.pdf (20 pgs.).
Boyen-X, et al—Identity-Based Cryptography Standard (IBCS) #1: Supersingular Curve Implementations of the BF and BB1 Cryptosystems, dated Dec. 2007—Webpage https://tools.ietf.org/html/rfc5091 (64 pgs.).
An Amazon.com company @ Alexa—Webpage: https://www.alexa.com/siteinfo (5 pgs.).
Stouffer, K. et al.—"The National Institute of Standards & Technology(NIST) Industrial Control System (ICS) security guide" dated May 2015 (247 pgs.).

* cited by examiner

KEY MANAGEMENT SYSTEM AND METHOD

FIELD

The disclosure relates generally to a public key encryption system and method and in particular to the management of the private keys in the public key encryption system.

BACKGROUND

Encryption is a well known technique used to obscure data or information, contained in a message, from unauthorized third parties. There are many different types of encryption that have been used. One popular type of encryption is public key encryption in which a public key and a private key are generated so that the private key and public key have a mathematical relationship that is computationally difficult to calculate at least from the private key to the public key. In other words, given only the public key, it is difficult to determine the private key. As a result, the public key can be publicly distributed (such as stored in a public key ring or key server) and the private key is kept securely by the user. When the user wants to send an encrypted message using public key encryption, the user finds the recipient's public key and encrypts the message using the public key of the recipient. When the recipient receives the message, the recipient uses his/her private key to decrypt the message. Similarly, when someone wants to send a message to the user, the message is encrypted using the public key of the user and the user decrypts the message using the secure private key. The advantage of public key encryption is that a private key of the user never has to be revealed or communicated to any third party.

FIG. 1 illustrates an ideal encryption key system 100 in which the system includes an application 102 that has the capability to encrypt/decrypt messages using public key encryption. The application may utilize a crypto service API to connect to a crypto API wrapper 104 that manages the public key encryption process of the application including the storage of the private key. In the ideal system in FIG. 1, the system also has a crypto service 106 that is accessible by a function call. The crypto service 106 may include crypto functions 108 and a key storage 110. The crypto service 106 may be securely hosted and protected from hackers and the like. In this ideal system, the crypto service 106 stores and manages the private key of the user and may also perform the decryption functions for the applications so that the private key is maintained on the secure crypto service 106.

FIG. 2 illustrates a typical encryption key system 200 that has the same application 202. In most typical implementations of the public key system, the application 202 may include a key storage 204 in which the private key of the user is stored and managed. As with the ideal system, the application may connect using a crypto function API to a crypto library 206 that has a plurality of crypto functions 208 to perform the encryption/decryption using the private key. In the typical system, to perform the encryption/decryption, the private key must be communicated from the key storage 204 in the application to the crypto library 206 which exposes the private key. In addition, with the system of FIG. 2, it is very difficult to update the private keys since they are stored on each application 202. Furthermore, in an Internet of Things (IoT) type system, the management of the private keys and thus the public key encryption system is not feasible. Thus, it is desirable to provide a system and method for managing the private keys of a public key encryption system.

DETAILED DESCRIPTION OF ONE OR MORE EMBODIMENTS

The disclosure is particularly applicable to private key management in a public key encryption system and method using for an Internet of Things (IoT) network and it is in this context that the disclosure will be described. It will be appreciated, however, that the private key management system may be used to manage the private keys of other encryption systems and may be used for any sized network or computer installation.

Figure 3:
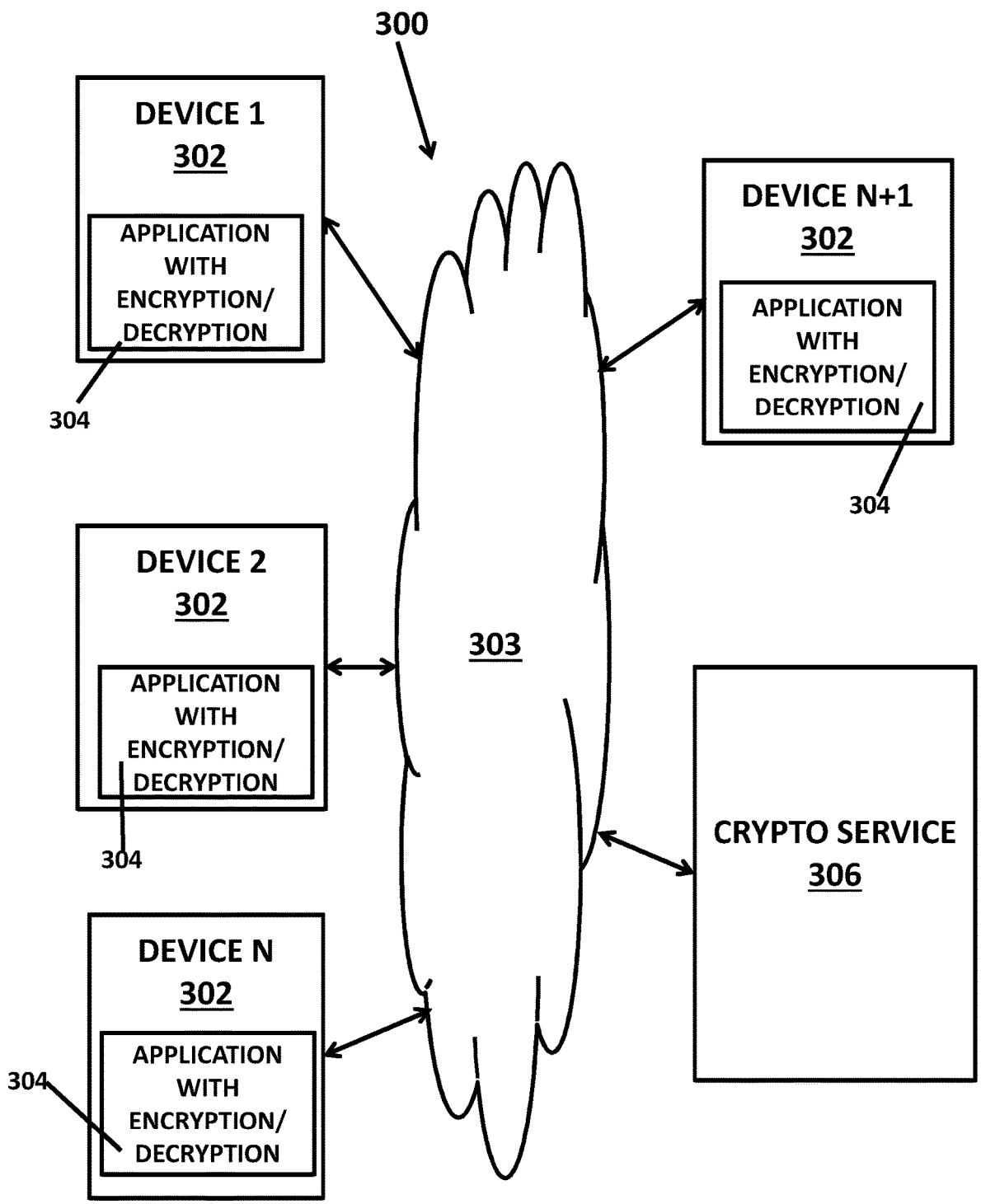
FIG. 3 illustrates a computer system network having a plurality of computing devices that uses public key encryption.

FIG. 3 illustrates a computer system network 300 having a plurality of computing devices 302, such as Device 1, . . . , Device N+1 as shown in FIG. 3, that each use public key encryption. The computer system network may be an Internet of Things (IoT) system in which each computing device 302 communicates through and across a communications path 303 to other computing devices 302. In this system, each computing device 302 in the IoT has a processor and executes an application having encryption/decryption capabilities 304 or a background encryption/decryption routine. The encryption/decryption capabilities may, for example, allow the computing devices 302 to securely communicate with each other. The computer network system 300 may also have a crypto service 306 connected to the communications path 303 that manages the private keys of the encryption/decryption element of each computing device 302 as described below in more detail.

Each computing device 302 may be a processor based device that has one or more processors, memory, a persistent storage device, such as a disk drive or flash, a display (optional for some of the computing devices like a thermostat) and communications circuits that allow each computing device 302 to communicate with/to other elements/devices of services on the computer system network 300. For example, each computing device 302 may be a personal computer, a laptop or tablet computer, a device that controls a function of a household like a thermostat or a door lock, an appliance in a household such as a refrigerator or oven and the like. In one embodiment, each computing device may execute the encryption/decryption element (having a plurality of lines of computer code) to provide the encryption/decryption capability. In another embodiment, the encryption/decryption element may be a piece of hardware, such as an integrated circuit, field programmable gate array, a microcontroller, a microprocessor and the like, that performs the encryption/decryption capabilities.

The crypto service 306 may be implemented in hardware or software. If the crypto service 306 is implemented in software, it may be a plurality of lines of computer code that may be executed by a processor of the computer system that hosts the crypto service 306. The computer system may be a server computer, an application server, a blade service, a cloud computing resource and the like. If the crypto service 306 is implemented in hardware, it may be an integrated circuit, field programmable gate array, a microcontroller, a microprocessor and the like that performs the key management processes described below.

Figure 5:
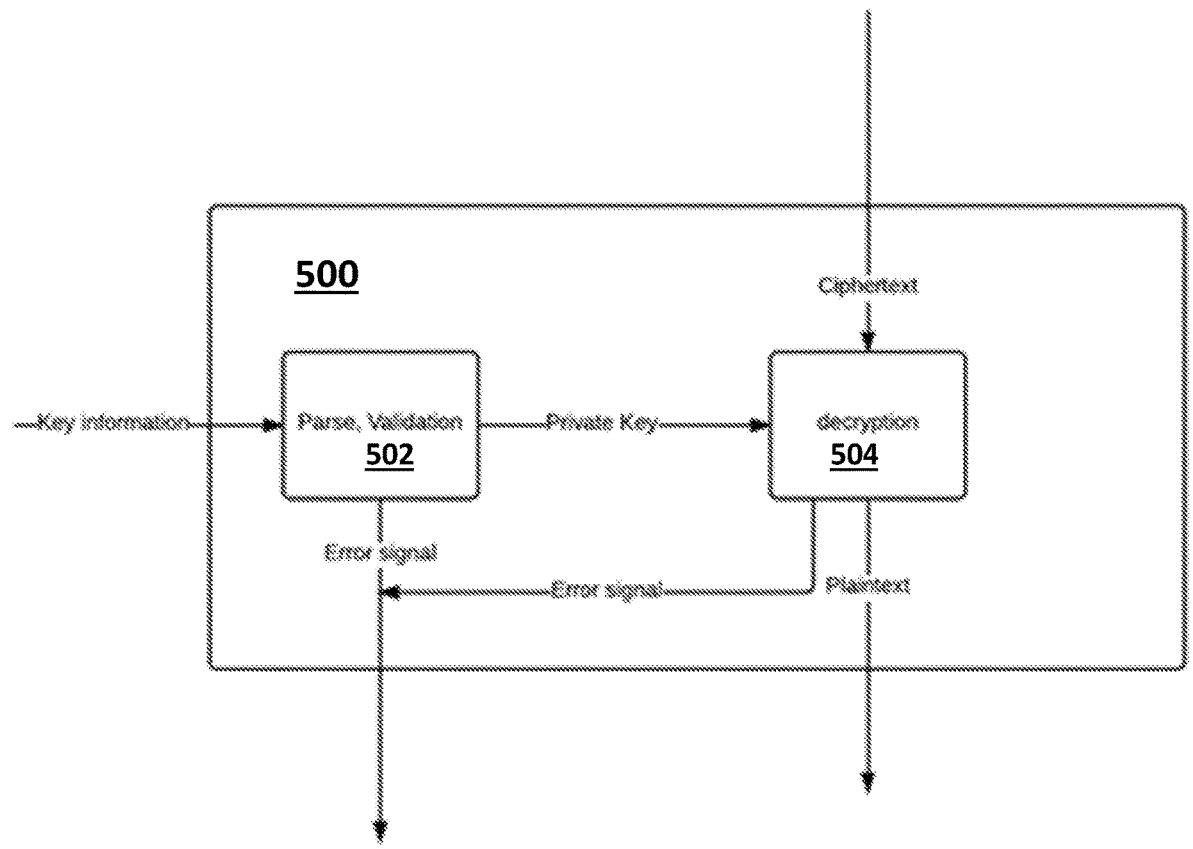
FIG. 5 illustrates a decryption module of the system in FIG. 2.
Figure 6:
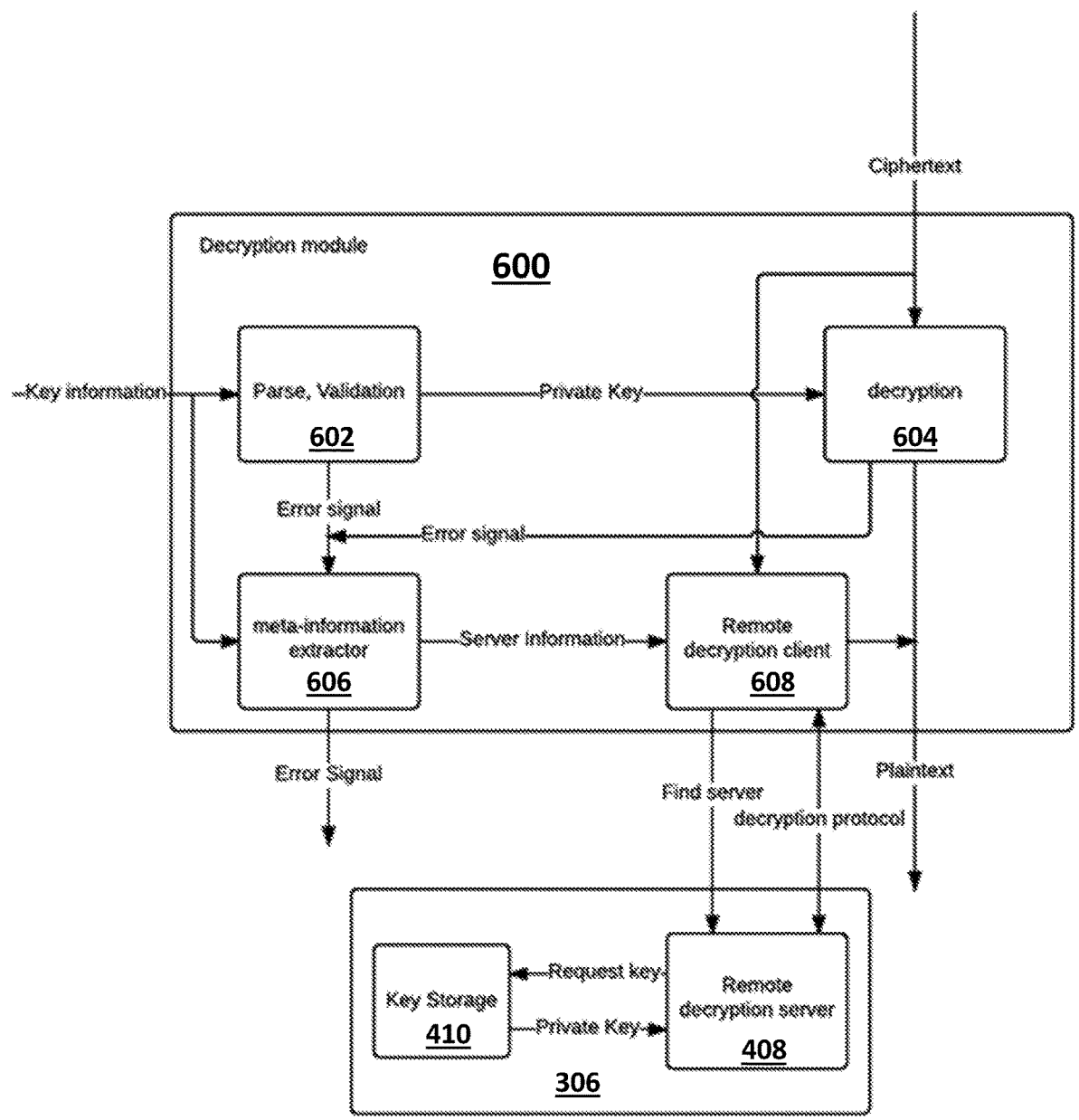
FIG. 6 illustrates a first implementation of a decryption module that may be used with the encryption system in FIG. 4.

In the computer system 300 shown in FIG. 3 or any other computer system, the private keys of each computing device 302 must be managed and maintained. The management and maintenance of the private keys of each computing device 302 can be very onerous for a large computer system or computer network like the IoT shown in FIG. 3. The system described below with reference to FIG. 4 as well as the decryption modules described below with reference to FIGS. 5-6 provide that private key management function as well as the encryption/decryption capabilities using the private key management function.

Figure 4:
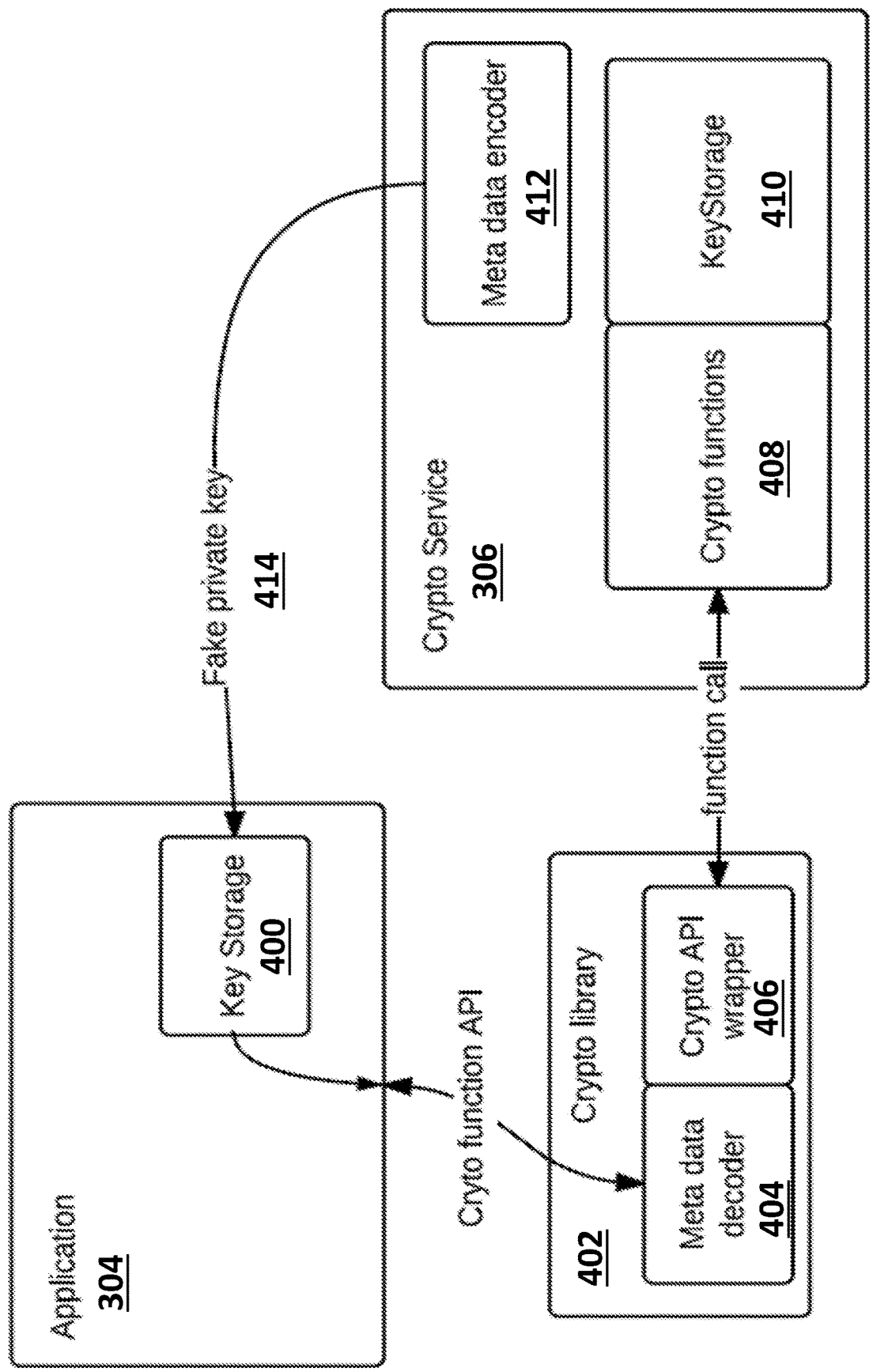
FIG. 4 illustrates a encryption key system with encryption key management.

FIG. 4 illustrates an encryption key system with key management. The encryption key system permits decrypting cyphertext to plaintext using key information that is stored on a remote source (such as the crypto service 306 in FIG. 4) without changing interfaces of the decryption modules for each of the one or more computing device(s). As with other encryption solutions, so that the encryption key system is compatible with existing encryption systems, the application 304 on each computing device is present and the application has encryption/decryption capacities. The application 304 may have a key storage 400 that stores the "fake" private keys of the encryption key system.

The application 304 may interface with a known crypto function API to a crypto library 402. The crypto library 402 may be separate from the application 304 and located on the same computer system as the application 304 or may be located on a remote computing resource of the computer system network. The crypto library 402 may further include a metadata decoder 404 and a crypto API wrapper 406 that operate to perform the encryption/decryption requested by the application 304 and manage the transmission of the data. The meta data decoder 404 may receive the "fake" private key from the storage 400 in the application 304 and then locate the actual private key in a remote key storage 410. The crypto API wrapper 406 may provide an interface for the encryption/decryption capabilities of the application 304 to the known crypto APIs that implement the encryption and decryption functions.

The encryption key system with key management may further comprise the crypto service element 306 that may be remote from the application 304 on the same computer system as the application 304 or on a different computer system in the computer system network 300. The crypto service element 306 may further comprise crypto functions 408, key storage 410 and a meta data encoder 412. The crypto functions 408 may store and distribute various crypto functions and manage the private key that may be stored in the key storage 410. As with any public key encryption system, the crypto functions 408 may include an encryption module/component to encrypt a message using the public key of the intended recipient and a decryption module/component for decrypting an incoming encrypted message using the private key of the user based on requests from the application 304 communicated using the crypto function APIs. The meta data encoder 412 may generate a "fake" private key 414 that corresponds to the actual private key for each application 304 (assuming each application has its own encryption/decryption element). The crypto service 306 may provide the fake private key 414 to key storage 400 of the encryption/decryption element of the application 304.

The key storage 410 may perform some of the key management functions in that it may store the private key for each entity as well as the corresponding fake private key so that the system is able to obtain the proper private key based on the fake private key to decrypt an encrypted piece of content.

The crypto library 402 and the crypto service 306 may each be implemented in hardware or software. When each of the crypto library 402 and the crypto service 306 are implemented in software, each of the crypto library 402 and the crypto service 306 may be a plurality of lines of computer code that may be executed by a processor of the computing resource/device on which the crypto library 402 or the crypto service 306 is hosted or stored. When each of the crypto library 402 and the crypto service 306 are implemented in hardware, each of the crypto library 402 and the crypto service 306 may be an integrated circuit, a field programmable gate array, a microcontroller, a microprocessor and the like that performs the functions of each component.

In operation, a sender of a message uses a public key of the user of the application 304 (or a public key associated with the application 304) to encrypt the message. When the application 304 receives a message to be decrypted, it retrieves the private key from the key storage 400 (which is the fake private key 414) and passes the fake private key 414 onto the crypto library 402 so that the meta data decoder 404 can decode the fake private key and request decryption using the private key from the key storage 410 where the actual private key is stored. The private key is then used to decrypt the message by the crypto functions 408 and the plaintext message is returned to the application 304. The fake private key 414 is a pointer to the actual private key stored in remote key storage 410. When the private key associated with the user or application needs to be updated: 1) a new private key may be generated by the crypto functions 408; 2) the private key may be stored in the remote key storage 410; 3) the meta data encoder 412 may generate a new fake private key 414 that acts as a pointer to the actual private key; and 4) the new fake private key may be sent to the application 304 and stored in the key storage 400. The application 304 uses the fake private key as if it is the actual private key so that management of the private key is easier. Similarly, for a new user or application, the system may: 1) generate a public key and private key pair; 2) generate a fake private key using the meta data encoder 412; 3) store the private key in the key storage 410; and 4) send the fake private key onto the application or new user for use as described above.

Using the system in FIGS. 3 and 4, the private keys associated with each computing device 302 and application 304 may be easily managed without changing interfaces of the decryption modules so that the system is compatible with existing public key encryption systems and their modules.

Figure 1:
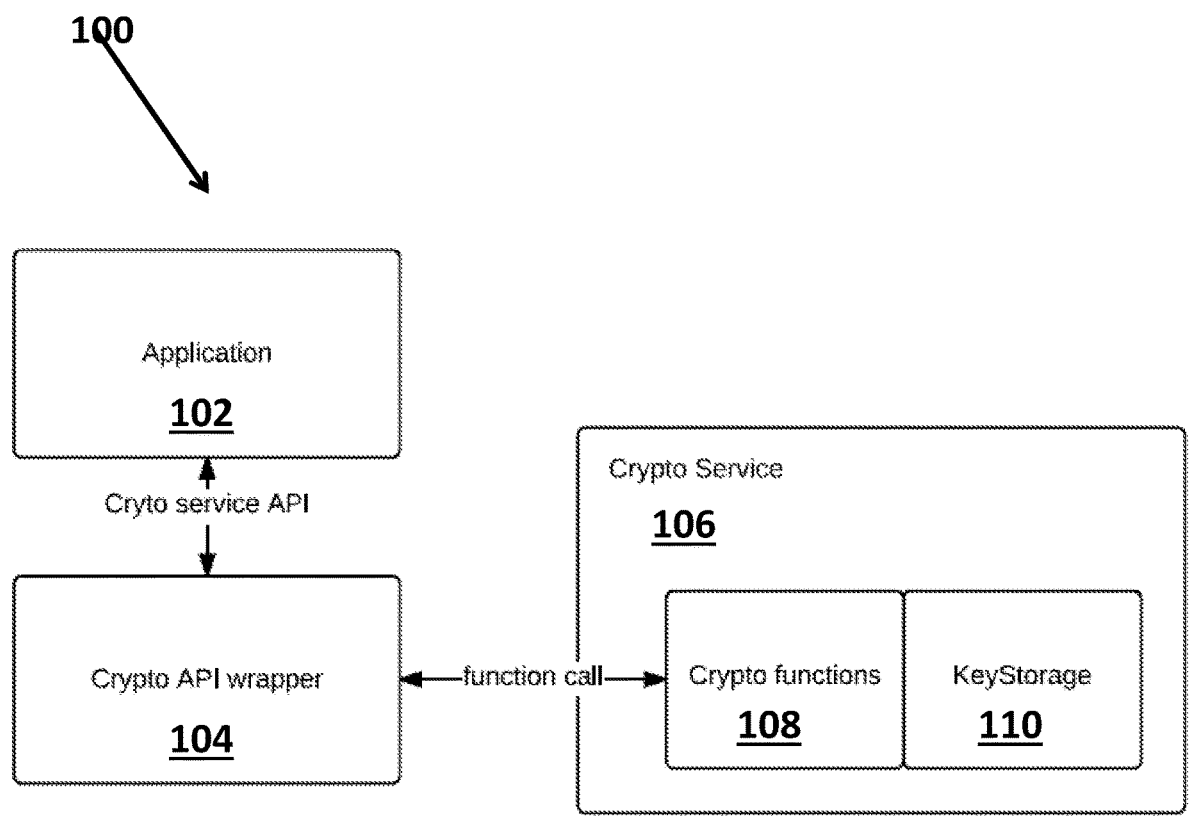
FIG. 1 illustrates an ideal encryption key system.
Figure 2:
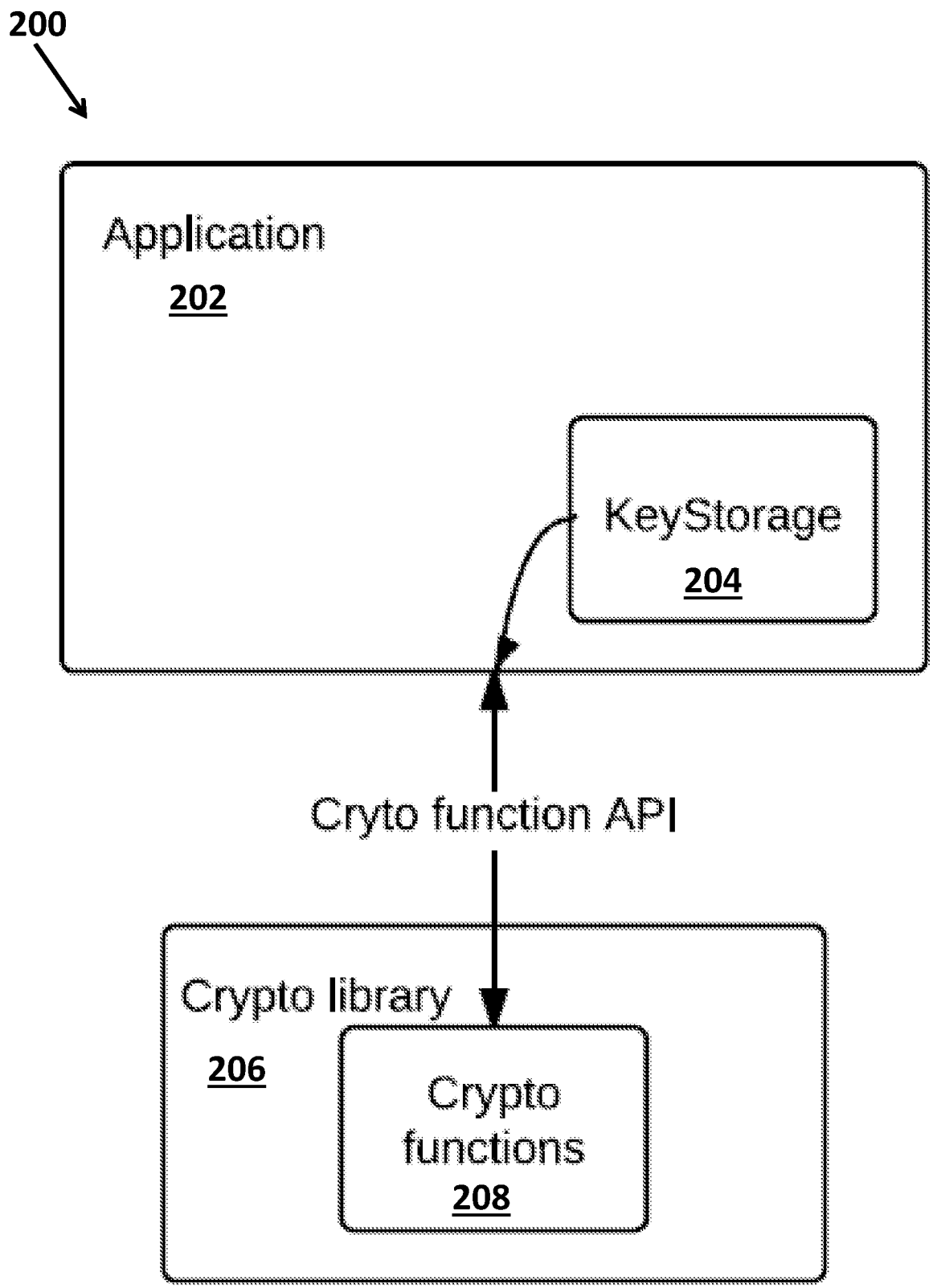
FIG. 2 illustrates a typical encryption key system.

FIG. 5 illustrates a decryption module 500 of the typical system in FIG. 2 that may include a parse/validation component 502 and a decryption component/module 504 as shown. The decryption module 504 receives private Key information and Ciphertext as inputs and output an error signal and Plaintext. The key information is processed by parser to obtain a set of cryptographic keys that are expressed by a mathematical comprehensive form, and the set is validated to determine if the set retains integrity of valid keys. The private key(s) that are required for decryption process are chosen from the set and sent to Decryption process 504. The decryption process 504 takes the ciphertext and Private Keys, and outputs plaintext by processing the decryption algorithm of the cipher.

FIG. 6 illustrates a first implementation of a decryption module 600 that may be used with the encryption system in FIGS. 3 and 4. The decryption module 600 may be part of the application 304 on the device or it may be part of the crypto service 306. The decryption module 600 may have a parser/validator component 602, a decryption component 604, a meta-information extractor component 606 and a remote decryption client 608. Each of these elements of the decryption module 600 may be implemented in hardware or software. As already described above for the encryption system, the system has the remote crypto service module 306 that has key storage 410 for the actual private keys of the entities (in which entities include users, applications and computing devices that have the encryption/decryption capabilities) and a remote decryption server that may incorporate the crypto functions 408 of the system. The decryption module takes Key information and Ciphertext (encrypted content) as inputs and outputs Plaintext (the decrypted content that was decrypted using the private key). Any error signals from Parse, Validation component 602 and the decryption component 604 are trapped by meta-information extractor 606 before the module aborts. The meta information extractor 606 extracts server information from the Key information. If the Server information is successfully obtained, server information is sent to the remote decryption client 608, and the Remote decryption client 608 contacts the remote server and performs the decryption process using a decryption protocol and the remote decryption server that has the crypto functions 408. The remote decryption server may request the private key for the decryption based on the key information from the fake private key and then perform the decryption using the actual private key from the key storage 410. Then the Remote decryption client 608 outputs Plaintext as the output from the module.

For example, consider a decryption module for a RSA cryptosystem. Suppose Key information consists of N, E, D, where N is the public modulus of RSA cipher and E is the public exponent, and D is the private key. To encrypt plaintext m, we compute m^E mod N to obtain ciphertext. To decrypt ciphertext c, we compute c^D mod N. We can implement meta-information extractor as shown below.

(1) Check if 2^(DE)=2 mod N. If true, then output error signal and abort.
(2) Parse D as a string to obtain URL of remote decryption server. If not successful output error signal and abort.
(3) Call remote decryption server with the URL on input.

Users can perform remote decryption without changing the interface of the decryption module. To perform remote decryption, (1) Get public key N, E, and string S that presents the URL of remote decryption server.
(2) Encode S as a big number to obtain D.
(3) Use N, E, D as the Key information.

As long as RSA cryptosystem is considered secure, it is practically impossible to collide D obtained above with the true public key showing that the above processes work.

If Key information carries more entries, then we can use them to embed server information. For example, if Key information has entries P and Q, prime numbers that satisfy N=PQ, then we can encode some part of URL, or the whole URL, to P or/and Q. The above system would also operate with other public key algorithms and/or elliptic curve cryptographies such as ECDH key agreement or EC ElGamal cipher.

Figure 7:
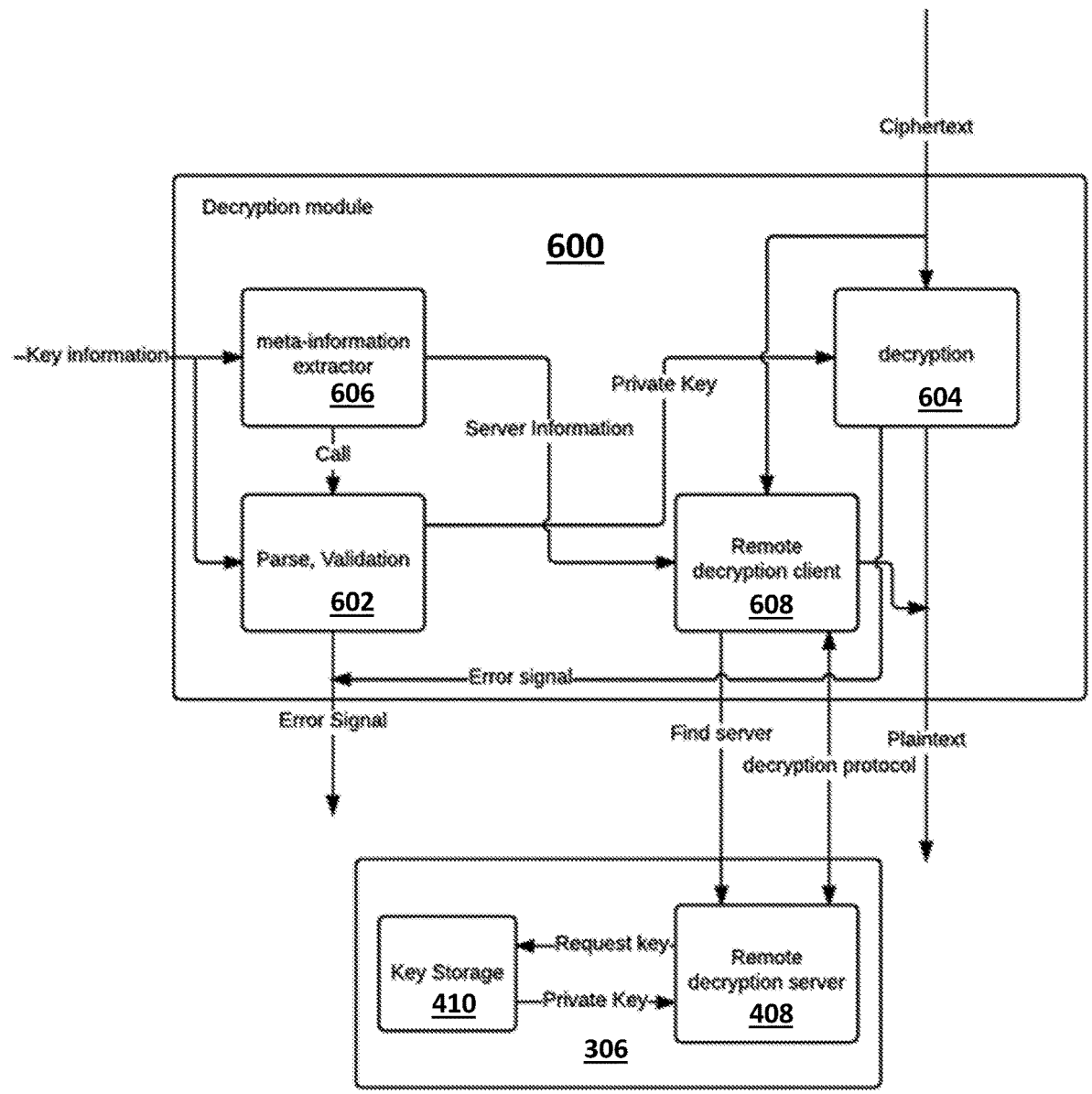
FIG. 7 illustrates a second implementation of a decryption module that may be used with the encryption system in FIG. 4.

FIG. 7 illustrates a second implementation of a decryption module that may be used with the encryption system in FIG. 4 that has similar elements to those shown in FIG. 6 that have a similar function (designated with the same reference numbers) and the description will not be repeated here. The decryption module 600 may be part of the application 304 on the device or it may be part of the crypto service 306. In this second implementation, the meta-information extractor 606 may be placed before the Parser and Validator 602. In this configuration, the meta-information extractor 606 may be implemented as shown below.

(1) Parse D as a string to obtain URL of remote decryption server. If not successful call Parse and Validate.
(2) Call remote decryption server with the URL on input.

This implementation works practically because it is very unlikely that the true private key has integrity as a URL string, since the private key is supposed to be chosen as a uniformly random number.

If Key information carries more entries, then the system can use them to embed server information. For example, if Key information has entries P and Q, prime numbers that satisfy N=PQ, then we can encode some part of URL, or the whole URL, to P or/and Q. In this situation we can implement meta-information extractor as shown below.

(1) Check D=0 and parse P as a string to obtain URL of remote decryption server. If not successful call Parse and Validate.
(2) Call remote decryption server with the URL on input.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder,"

"above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A key management method for public key encryption, comprising:
    storing, remotely from an entity, a plurality of set of encryption keys for entities in the system that have decryption capabilities, the set of encryption keys for each entity having a private encryption key of the entity and a fake private key generated based on the private encryption key corresponding to the private encryption key of the entity;
    receiving, from the entity, a piece of ciphertext content and a fake private key; and
    obtaining, when the piece of ciphertext content is being decrypted for a particular entity using the private encryption key, the private encryption key of the entity from the remotely stored set of keys for the particular entity based on the fake private key.

2. The method of claim 1 further comprising generating a new private key for the particular entity and a fake private key that corresponds to the new private key for the particular entity and sending the fake private key to the particular entity.

3. The method of claim 2 further comprising decrypting the piece of ciphertext content using the new private key of the entity.

4. The method of claim 2, wherein obtaining the private key for the particular entity further comprises extracting a uniform resource locator of the cryptographic component from key information and retrieving the new private key of the particular entity based on the uniform resource locator of the cryptographic component and the fake private key.

5. The method of claim 1, wherein each entity is a computing device with application that has decryption capabilities.

6. The method of claim 1, wherein each entity is one of an application having a decryption capability, a device having a decryption capability and a user that uses an application with a decryption capability.

7. The method of claim 1, wherein the fake private key for the particular entity further comprises a pointer to new private key for the particular entity.

8. A key management system, comprising:
    one or more entities, each entity having a public key decryption capability using a private encryption key of the entity and a key store;
    a computer system having a processor and memory and a cryptographic component, connected to the entities by a computer network, having a metadata encoder that generates a new private encryption key for a particular entity and generates a fake private key generated based on the private encryption key that corresponds to the new private encryption key; and
    wherein the cryptographic component sends the fake private key to the particular entity.

9. The system of claim 8, wherein the cryptographic component performs a decryption process based on a request from the particular client wherein the request includes a piece of ciphertext and the fake private key and the cryptographic component obtains the new private key of the particular entity based on the fake private key to permit the decryption of the ciphertext using the new private key of the particular entity.

10. The system of claim 9, wherein each entity has a decryption module that performs the decryption of the ciphertext using the new private key of the particular entity.

11. The system of claim 10, wherein the decryption module further comprises a parser module that receives key information and a meta-information extractor module obtains the new private key for the particular entity based on the fake private key.

12. The system of claim 11, wherein the meta-information extractor module extracts a uniform resource locator of the cryptographic component from the key information and retrieves the new private key of the particular entity based on the uniform resource locator of the cryptographic component.

13. The system of claim 8, wherein each entity is a computing device with application that has decryption capabilities.

14. The system of claim 8, wherein each entity is one of an application having a decryption capability, a device having a decryption capability and a user that uses an application with a decryption capability.

15. The system of claim 8, wherein the fake private key for the particular entity further comprises a pointer to new private key for the particular entity.

16. A public key encryption system, comprising:
    one or more entities, each entity having a public key decryption capability using a private encryption key of the entity and a key store;
    a computer system having a processor and memory and a cryptographic component, connected to the entities by a computer network, having a metadata encoder that generates a new private encryption key for a particular entity and generates a fake private key generated based on the private encryption key that corresponds to the new private encryption key; and
    wherein the cryptographic component sends the fake private key to the particular entity.

17. The system of claim 16, wherein the cryptographic component performs a decryption process based on a request from the particular client wherein the request includes a piece of ciphertext and the fake private key and the cryptographic component obtains the new private key of the particular entity based on the fake private key to permit the decryption of the ciphertext using the new private key of the particular entity.

18. The system of claim 17, wherein each entity has a decryption module that performs the decryption of the ciphertext using the new private key of the particular entity.

19. The system of claim 18, wherein the decryption module further comprises a parser module that receives key information and a meta-information extractor module obtains the new private key for the particular entity based on the fake private key.

20. The system of claim 19, wherein the meta-information extractor module extracts a uniform resource locator of the cryptographic component from the key information and retrieves the new private key of the particular entity based on the uniform resource locator of the cryptographic component.

21. The system of claim 16, wherein each entity is a computing device with application that has decryption capabilities.

22. The system of claim 16, wherein each entity is one of an application having a decryption capability, a device having a decryption capability and a user that uses an application with a decryption capability.

23. The system of claim 16, wherein the fake private key for the particular entity further comprises a pointer to new private key for the particular entity.

24. A key management method, comprising:

generating a private key for an entity, the private key decrypting a piece of ciphertext sent to the entity;

storing the generated private key in a key management component having a key storage remote from the entity;

generating, at a key management component, a fake private key using the private encryption key that acts as a pointer to the generated private key; and sending the fake private key to the entity to store in a key storage, wherein the entity decrypts the piece of ciphertext by making a request using the fake private key.

25. The method of claim 24 further comprising generating a public key for the entity wherein the entity is a new entity.

26. The method of claim 24, wherein generating the private key for an entity further comprises generating a new private key for an existing entity.

27. The method of claim 24, wherein the entity is a computing device having a decryption capability.

28. The method of claim 24, wherein the entity is one of an application having a decryption capability, a device having a decryption capability and a user that uses an application with a decryption capability.

29. The method of claim 24, wherein the fake private key for the particular entity further comprises a pointer to new private key for the particular entity.

* * * * *